US008181937B2

(12) United States Patent
Schwindaman et al.

(10) Patent No.: US 8,181,937 B2
(45) Date of Patent: May 22, 2012

(54) HYDRAULIC LEVELING CYLINDER

(75) Inventors: Michael A. Schwindaman, Cassopolis, MI (US); Thomas J. Rogers, Cassopolis, MI (US); Michael W. Howard, Elkhart, IN (US)

(73) Assignee: Lippert Components Manufacturing, Inc., Goshen, IN (US)

( * ) Notice: Subject to any disclaimer, the term of this patent is extended or adjusted under 35 U.S.C. 154(b) by 0 days.

(21) Appl. No.: 13/189,620

(22) Filed: Jul. 25, 2011

(65) Prior Publication Data

US 2011/0283879 A1 Nov. 24, 2011

Related U.S. Application Data

(62) Division of application No. 12/355,320, filed on Jan. 16, 2009.

(60) Provisional application No. 61/135,752, filed on Jul. 23, 2008.

(51) Int. Cl.

| | |
|---|---|
| ***A62B 3/00*** | (2006.01) |
| ***B66F 3/24*** | (2006.01) |
| ***B66F 7/10*** | (2006.01) |
| ***B66F 7/12*** | (2006.01) |
| ***E21D 15/44*** | (2006.01) |
| ***B60S 9/02*** | (2006.01) |
| ***B23Q 3/08*** | (2006.01) |

(52) U.S. Cl. ....... 254/423; 254/418; 254/419; 254/93 R; 254/89 H; 269/32

(58) Field of Classification Search .................. 254/418, 254/423, 419, 93 R, 89 H; 269/32
See application file for complete search history.

(56) References Cited

U.S. PATENT DOCUMENTS

| | | | | |
|---|---|---|---|---|
| 3,185,043 | A | 5/1965 | Dunham | |
| 3,362,683 | A | 1/1968 | Hansen | |
| 3,614,064 | A | 10/1971 | Bennett | |
| 3,650,182 | A | 3/1972 | Phillips | |
| 3,656,778 | A | 4/1972 | Bristol | |
| 3,782,689 | A * | 1/1974 | Barosko | 254/93 R |
| 3,857,582 | A | 12/1974 | Hartog | |
| 4,165,861 | A | 8/1979 | Hanser | |
| 4,216,939 | A | 8/1980 | Valdespino | |
| 4,481,864 | A * | 11/1984 | Peruzzi | 91/44 |
| 4,532,151 | A | 7/1985 | Stenlund | |
| 4,711,428 | A | 12/1987 | Carpenter | |

(Continued)

FOREIGN PATENT DOCUMENTS

WO WO 98/38431 3/1998

*Primary Examiner* — Monica Carter
*Assistant Examiner* — Seahee Yoon
(74) *Attorney, Agent, or Firm* — Barnes & Thornburg LLP

(57) ABSTRACT

An anodized aluminum hydraulic leveling cylinder 10 for a vehicle includes an extruded hollow body 20 having a vehicle attachment portion 24 for attaching the body to the underside of a vehicle. A piston 80 is slidably fitted into the interior of the body. The piston is formed of ductile aluminum capable of being machined to a desirable shape and dimensions. The piston is hard anodized and PTFE coated for durable and silent operation. Hydraulic oil passage means 23*a*, 23*b* is formed in the body, and a cap 50 with a pair of dual flow-through passages 53 is attached to the top end 30 of the body for permitting the flow of pressurized hydraulic oil into and out of the interior of the body to effect axial movement of the piston. Hydraulic fluid may be transferred through one or more hollow mounting bolts.

14 Claims, 3 Drawing Sheets

U.S. PATENT DOCUMENTS

| | | | | |
|---|---|---|---|---|
| 4,815,711 | A | 3/1989 | Bruno et al. | |
| 5,842,911 | A | 12/1998 | Weber | |
| 6,044,752 | A * | 4/2000 | Harigaya | 92/163 |
| 6,089,603 | A | 7/2000 | Ackley | |
| 6,415,876 | B1 | 7/2002 | Bollinger et al. | |
| 6,427,508 | B1 * | 8/2002 | Lehto et al. | 72/71 |
| 6,637,315 | B2 | 10/2003 | Mickelson | |
| 6,742,767 | B1 * | 6/2004 | Bruzek | 254/93 H |
| 7,296,784 | B2 | 11/2007 | Peter | |

* cited by examiner

HYDRAULIC LEVELING CYLINDER

CROSS REFERENCE TO RELATED APPLICATIONS

This application is a division of co-pending U.S. patent application Ser. No. 12/355,320, filed Jan. 16, 2009, which application claims the benefit of U.S. Provisional Application No. 61/135,752, filed Jul. 23, 2008, the disclosure of which is hereby incorporated by reference.

BACKGROUND OF THE INVENTION

1. Field of the Invention

The subject matter of the invention relates to vehicle stabilization systems and, more particularly, to hydraulic leveling cylinders for such systems.

2. Description of the Background of the Invention

Numerous vehicle stabilization systems have been available in the marketplace. Some vehicle stabilization systems incorporate hydraulic cylinders each of which has the capability of stabilizing and supporting its proportionate share of the weight of the vehicle. Such cylinders are typically capable of supporting from 3,000 to 23,000 pounds each with a corresponding hydraulic fluid line connecting it to a fluid pump. The cylinders may be connected to the pump in series so that up and/or down movement of the cylinder pistons may be synchronized.

Hydraulic leveling cylinders have been provided, for vehicle stabilizing systems. All such hydraulic cylinder units, however, have been made of steel adding significantly to the overall weight of the vehicle. For example, a specific hydraulic cylinder unit for a Class A motor home can weigh up to about sixty-five (65) pounds. This weight is multiplied by four because a typical stabilizing system includes four cylinder units. The weight of a steel leveling cylinder system negatively impacts vehicle performance and fuel economy.

Additionally, manufacture of steel hydraulic cylinders is expensive. The steel units must be machined, their piston rods chrome plated, and their various components such as vehicle mounts, ports for hydraulic lines, and fittings welded to the cylinder. These steps add significantly to the labor and overall cost per cylinder unit. Chrome plating requires tanks, fume scrubbers, safety protocols, and other costly health and environmental considerations.

Another problem is that steel cylinders rust. Protective plating processes, such as zinc, use acids that destroy the cylinder seals. Powder and e-coating processes require high firing temperatures that destroy the fluid seals. Rust, therefore, eventually causes the cylinder to leak fluid and fail.

Steel cylinders, by design, require one fluid hose to be attached to the top of the cylinder and one hose attached to the bottom of the cylinder. When mounted to the underside of the vehicle, the bottom of the cylinder is generally located just inches from the road surface. Inasmuch as the height may be somewhat adjustable, the cylinders are located close to the vehicle's tires. Road debris from the tires damages the plastic fluid lines attached to the cylinder. When one of these fluid hoses is breached, loss of holding pressure to the entire system results. The cylinders then drift down toward the road surface, which may be hazardous. It is desirable, therefore to eliminate ports on the low end of the cylinder and eliminate the number of fluid lines that are exposed during vehicle travel.

Another issue deals with bothersome noises brought about by ambient temperature change after leveling the vehicle. As hydraulic oil cools, the pressure inside the cylinder decreases causing the piston(s) to settle slightly. Due to the plating of the steel and the complement of ring seals necessitated by those surfaces, there is no oil coating the inside wall of the cylinder gland. Accordingly, no way exists to silence the creaking and cracking sounds that occur during settling as the piston rod slides against the interior wall of the cylinder gland.

There therefore remains a need for a new and improved hydraulic leveling cylinder for a vehicle stabilization system.

SUMMARY OF THE INVENTION

In the broader aspects of the invention, an aluminum hydraulic leveling cylinder for a vehicle includes a hollow cylinder having a body. The body may include a vehicle attachment portion for attaching the cylinder to the underside of a vehicle. A piston is slidably fitted into the interior of the cylinder. Hydraulic oil passage means may be formed in the body for permitting the flow of pressurized hydraulic oil into and out of the interior of the cylinder so as to effect axial movement of the piston. The body may be of extruded aluminum. The body may be anodized.

In another aspect of the invention, the piston rod may be formed of aluminum having an exterior coating of about 0.0005 to about 0.005 inches of anodized aluminum oxide having a hardness above 60 Rockwell C. The coating may be impregnated with polytetrafluoroethylene (PTFE).

In yet another aspect, a top cap having ports formed in it is secured to the top end of the cylinder by bolts. Passages are formed in the top cap for connecting the ports with the hydraulic oil passage means within the body of the cylinder. A passage and a port are formed in at least one of the bolts to permit the flow of pressurized hydraulic oil through the bolt. The hydraulic line(s) may, therefore, be attached at the top of the cylinder.

In still another aspect, the aluminum from which the leveling cylinder and piston rod are made is chosen from the group consisting of 2000, 3000, 5000, 6000, and 7000 aluminum alloys.

One object of the present invention is to provide an improved hydraulic leveling cylinder for vehicles that is lighter and more durable than prior vehicle leveling cylinder units made of steel. Related objects and advantages of the present invention will be apparent from the following description.

DETAILED DESCRIPTION OF INVENTION

Figure 1:
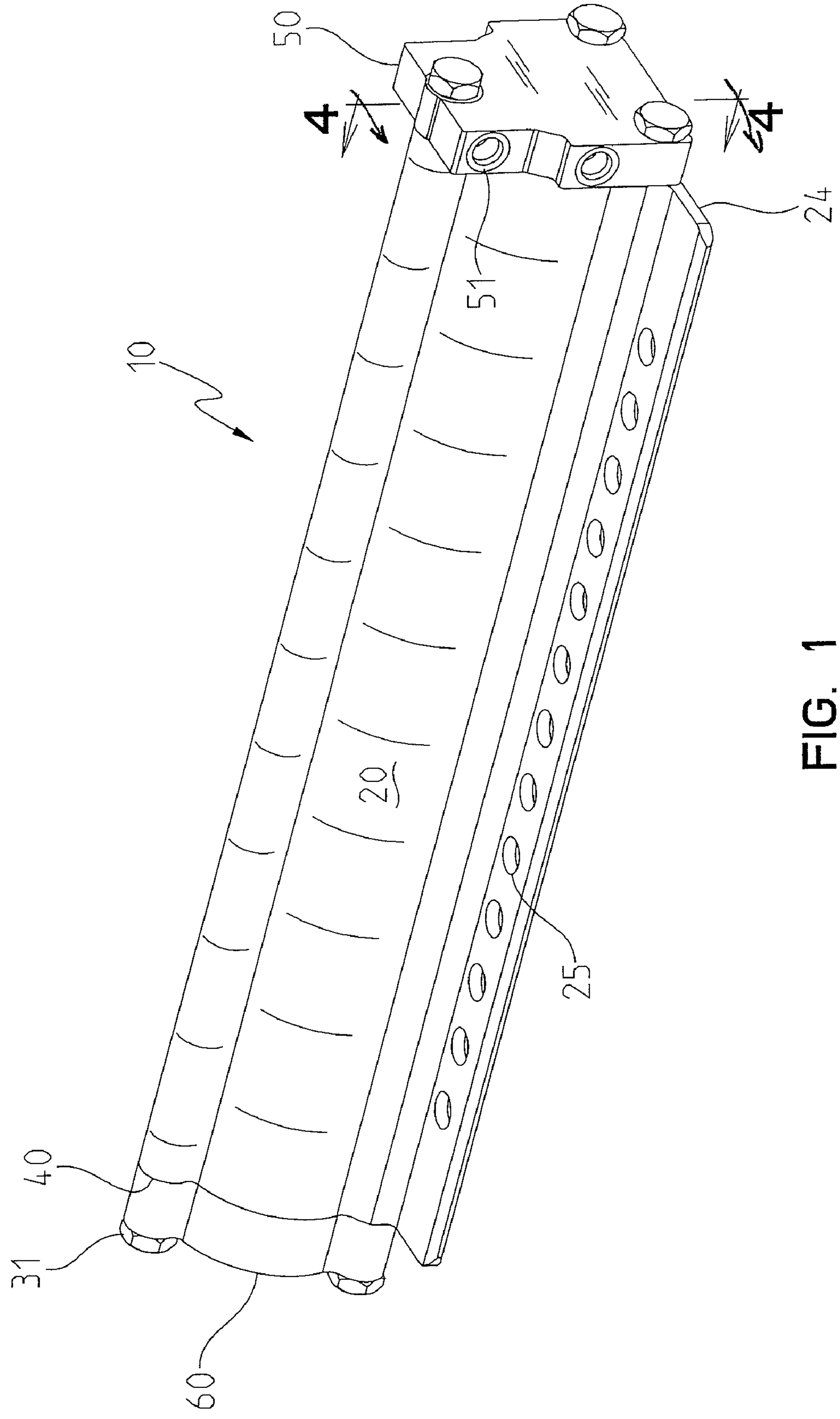
FIG. 1 is an isometric view of an embodiment of the hydraulic leveling cylinder of the invention.

For the purposes of promoting an understanding of the principles of the invention and presenting its currently understood best mode of operation, reference will now be made to the embodiments illustrated in the drawings and specific. language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

FIG. 1 shows a hydraulic leveling cylinder 10 for a vehicle stabilizing system of the type typically used to level and stabilize self-propelled and tow behind trailers and motor homes when at rest. These systems typically include three or more hydraulic cylinder units connected directly or indirectly to a hydraulic fluid pump for powering the system. The cylinder 10 embodiment of FIG. 1 includes a hollow body 20 and may have an integrally formed lateral wing 24 extending along each side of body 20. The wings 24 may be integrally extruded with body 20 as described below in any predetermined size, or wings 24 may be separate parts welded or otherwise attached to body 20 during assembly in accordance to the mounting scheme desired.

In the example illustrated, wings 24 are apertured to ease vertical attachment of cylinder 10 to the frame at most any height desired underneath the vehicle.

The body includes a top 30 and a bottom 40 and is preferably formed by extruding any one of aluminum alloys having sufficient strength and hardness from the 2000, 3000, 5000, 6000, and 7000 groups. More favorable results have been achieved when aluminum alloys from the 6000 and 7000 groups have been used. Most preferably, however, body 20 may be formed using any alloy having a tensile strength above 30,000 psi. Body 20 may be anodized as well.

Figure 2:
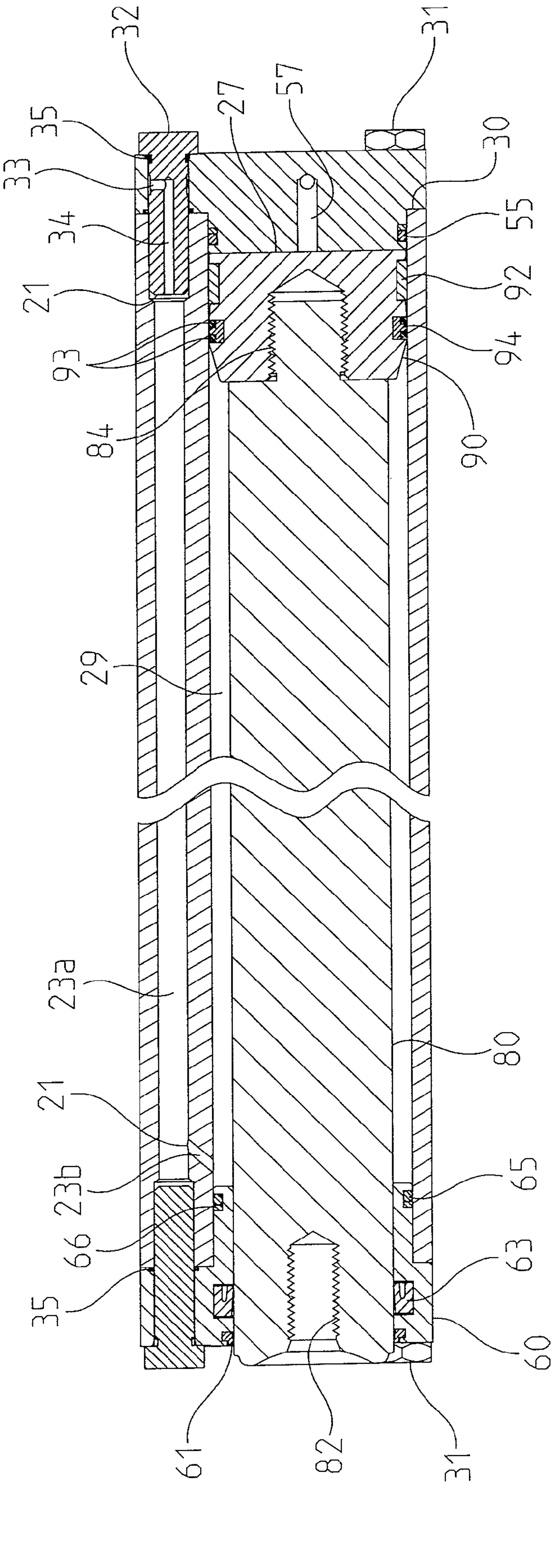
FIG. 2 is a longitudinal. cross-section of an embodiment of the hydraulic leveling cylinder.

Referring to all of the figures, in the embodiment shown in the drawings, hollow body 20 includes an interior wall 22, integrally formed ports 21, and passages 23*a*, 23*b* for providing means for transferring pressurized fluid into and out of the lower cavity 29 of the cylinder 10. Hollows 26 are formed to receive bolts 31, and may selectively be used as passages as exemplified by passage 23*a*. All fluid lines to cylinder 10 may therefore be coupled at the top end 30, which places them higher above the road surface protecting the lines and connections from damage during travel. In the embodiment illustrated, one of the integral passages 23*a* may be integrally cast and extend longitudinally along body 20, and, in that embodiment, another passage 23*b* is angled obliquely relative to the longitudinal passage and connects longitudinal passage 23*a* and the lower cavity 29, as shown in FIG. 2.

A piston 80 is slidably fitted into the interior of body 20. Piston 80 may comprise a single cylindrically shaped unit or, as illustrated, a solid rod having a hollow portion 82 with internal threads at one end for receiving a base (not shown) and a protuberant portion 84 with external threads at the other end for attaching an aluminum head 90. Piston 80 may be made lighter in weight by coring piston 80 longitudinally so as to produce a hollow rod. Piston 80 and head 90 are preferably formed of ductile aluminum capable of being machined to a desirable shape and dimensions. The piston rod is hard anodized, preferably Type III, and PTFE coated, which eliminates creaking and cracking sounds caused by thermal expansion and contraction as the piston rod slides against the interior wall of the cylinder gland.

Type III anodizing produces a desirable coating of between about 0.0005 to about 0.005 inches of anodized aluminum oxide having a hardness above 60 Rockwell C. Accordingly, the hydraulic cylinder unit 10 of the invention is considerably stronger and has a longer working life than heretofore available steel leveling cylinders. Aluminum is chosen from the group consisting of 2000, 3000, 5000, 6000, and 7000 aluminum alloys. An aluminum alloy from the 6000 or 7000 group, hard anodized and PTFE impregnated as above-described would appear to be the preferred manufacturing method for piston rod 80 at the time of this writing.

Piston head 90 is fluidly sealed inside the interior of the body 20 by a load-bearing ring 92, preferably a glass filled nylon ring circumscribing head 90, and a seal. The seal may include a pair of substantially rigid backup rings 93 also circumscribing the head and located downstream from the top of head 90 with a circumscribing T-seal 94 between the backup rings 93. Backup rings 93 prevent the more deformable T-seal 94 from leaking.

Caps 50, 60 are secured, respectively, to the top end 30 and bottom end 40 of body 20 by bolts 31. Top cap 50 and bottom cap 60 are sealed in a fluid tight fashion at respective ends of the body using known means such as o-rings 55, 65. The bottom cap 60 includes a backup ring for additional support of o-ring 65, a piston rod wiper 61 for wiping the piston rod and a lip seal 63.

Figure 3:
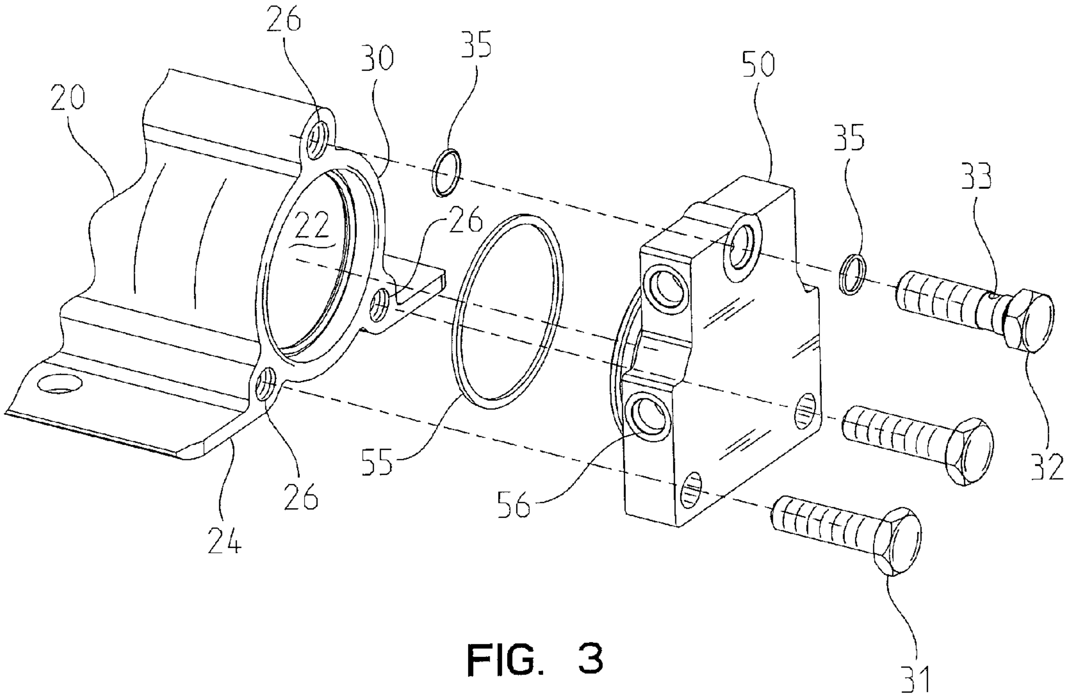
FIG. 3 is an exploded perspective view of an embodiment of the hydraulic leveling cylinder of the invention showing the top cap.
Figure 4:
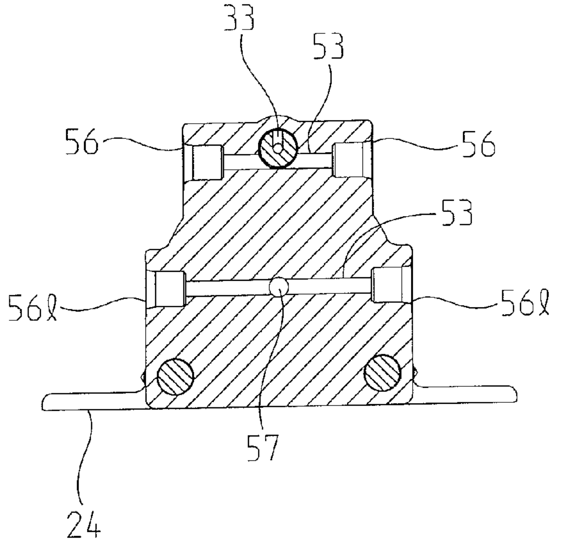
FIG. 4 is a cross-sectional view of the top cap of the hydraulic leveling cylinder taken along lines 4-4 of FIG. 1.

Top cap 50 includes two pairs of oppositely disposed ports 56, which include an upper pair and a lower pair, as shown in FIG. 4. Each pair of ports is connected by a corresponding transverse passage 53. As best illustrated in FIGS. 2-4, a banjo bolt 32 selectively occludes the passage 53 between the upper pair of ports 54. The banjo bolt includes a port 33 and a passage 34 that connects the upper transverse passage 53 and the aforementioned integral passages 23*a*, 23*b* to permit the flow of pressurized fluid into and out of the lower cavity 29 of the cylinder 10. Banjo bolt 32 is sealed via o-ring seals 35.

Fluid flow into and out of the upper cavity 27 (shown in FIG. 2 as a line since the piston 80 is in a fully retracted position) is accomplished by the passage 53 connecting the lower pair of ports 56*l*. Note that longitudinal passage 57 interrupts the flow-thru passage 53 connecting the lower ports and the upper cavity 27. Cap 50 is made to preferably include plugs (not shown) so that either one or both of the ports 56, 56*l* can be open. This permits one cylinder unit 10 to be connected via fluid lines to another cylinder unit 10 and so on as desired so that movement of the pistons 80 may be synchronized. This option is possible with existing steel cylinders only in combination with expensive fittings, which have to be welded to the cylinder and typically leak.

The new, novel, and improved leveling cylinder 10 of the invention provides an improved leveling cylinder for a vehicle stabilizing system that is more durable and significantly lighter in weight than steel. The new cylinder unit 10 may provide integral oil passage means 23*a*, 23*b* and a top cap 50 with dual flow-thru passages 53, 53*l* and ports 56 with plugs, which make it possible to daisy chain cylinders 10 together without expensive fittings having to be welded to the cylinder. One hydraulic line per cylinder may be optionally eliminated, and the necessary line(s) may be coupled to the top end 30 of the cylinder, which protects the connections and lines from. flying road debris.

The aluminum body 20 will not rust or appear unsightly and its construction. eliminates the significant cost associated with manufacture of steel cylinders and piston rods, including chrome plating. Aluminum piston rod 80 is hard coated via Type III anodizing and PTFE coated, which silences the creaking and cracking sounds that occur during settling as the piston rod slides against the cap 60 of the cylinder.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments, and that it would be impractical to attempt to describe all such embodiment variations in the present specification. Accordingly, it is understood that all changes and modifications that come within the spirit of the invention are desired to be protected.

What is claimed is:

1. Hydraulic leveling cylinder for a vehicle comprising:

a housing defining a pair of substantially parallel, transversely offset bores;

a double acting piston slidably mounted in one of said bores and defining a pair of oppositely acting pressure chambers between said piston and opposite ends of said housing;

a pair of fluid pressure ports, one said ports communicating fluid pressure into one of said pressure chambers and the other said port into the other bore; and a transverse passage extending through said housing to communicate the other bore with the other pressure chamber.

2. Leveling cylinder as claimed in claim 1, wherein an end cap closes one end of both of said bores, said fluid pressure ports being mounted in said end cap.

3. Leveling cylinder as claimed in claim 2, wherein a fastener secures the end cap to the housing, and a fastener passage extending through the fastener communicating said other bore with one of said ports.

4. Leveling cylinder as claimed in claim 2, wherein a threaded fastener secures said end cap to said housing, said other bore having a threaded section adjacent said one end of the other bore threadedly receiving the threads of said fastener to secure the end cap to the housing.

5. Leveling cylinder as claimed in claim 4, wherein a fastener passage extends through said fastener communicating said other bore with one of said ports.

6. Leveling cylinder as claimed in claim 4, wherein a circumferentially extending seal circumscribes said fastener and sealingly engages said end cap.

7. Leveling cylinder as claimed in claim 5, wherein the fastener passage includes an axially extending section communicating with said other bore and a transverse port section communicating the axially extending section with the other port.

8. Leveling cylinder as claimed as claimed in claim 3, wherein the fastener passage includes an axially extending section communicating with said other bore and a transverse port section communicating the axially extending section with the other port.

9. Leveling cylinder as claimed in claim 2, wherein an end cap closes one end of both of said bores, said fluid pressure ports being mounted in said end cap, and a plug extending into said other bore, and passage means extending through said plug communicating the other port with said other bore.

10. Leveling cylinder as claimed in claim 9, wherein said plug is a threaded fastener securing said end cap to said housing.

11. Hydraulic leveling cylinder comprising:

a housing defining a bore therewithin;

a double acting piston slidably mounted in said bore and defining a pair of oppositely acting pressure chambers between said piston and opposite ends of said housing;

an end cap mounted on one end of said housing;

a pair of ports defined on said end cap, one of said ports being communicated to one of the pressure chambers; and a fastener securing said end cap to the housing, said fastener including a fastener passage extending through said fastener to communicate said other port to the other pressure chamber.

12. Leveling cylinder as claimed in claim 11, wherein said fastener is a bolt having threads engaging corresponding threads of said housing.

13. Leveling cylinder as claimed in claim 12, wherein a circumferentially extending seal circumscribes said passage and sealingly engages said end cap.

14. Leveling cylinder as claimed in claim 13, wherein the fastener passage includes an axially extending section communicating with said other bore and a transverse port section communicating the axially extending section with the other port.

* * * * *